United States Patent [19]

Priven et al.

[11] Patent Number: 5,327,559
[45] Date of Patent: Jul. 5, 1994

[54] REMOTE AND BATCH PROCESSING IN AN OBJECT ORIENTED PROGRAMMING SYSTEM

[75] Inventors: Michael P. Priven; Robert L. Abraham, both of Marietta; Floyd W. Shackelford, Buford; Richard E. Moore, Marietta; Thomas P. Moorman; April D. E. Stiles, both of Atlanta; Jane E. Schrock, Kennesaw, all of Ga.

[73] Assignee: International Business Machines Corporation, Armonk, N.Y.

[21] Appl. No.: 602,434

[22] Filed: Oct. 23, 1990

[51] Int. Cl.⁵ .................... G06F 9/44; G06F 15/16
[52] U.S. Cl. ................................ 395/700; 395/200; 364/DIG. 1; 364/284.3; 364/284; 364/280
[58] Field of Search ............... 395/650, 700, 200, 600, 395/500, 575, 159, 51, 135

[56] References Cited

U.S. PATENT DOCUMENTS

| | | |
|---|---|---|
| 4,509,119 | 4/1985 | Gumaer et al. |
| 4,635,208 | 1/1987 | Coleby et al. |
| 4,736,320 | 4/1988 | Bristol ................... 395/700 |
| 4,791,550 | 12/1988 | Stevenson et al. ........... 395/650 |
| 4,853,843 | 8/1989 | Acklund. |
| 4,935,876 | 6/1990 | Hanatsuka ................. 395/51 |
| 5,060,150 | 10/1991 | Simor ..................... 364/264 |
| 5,062,060 | 10/1991 | Kolnick ................... 395/159 |
| 5,111,384 | 5/1992 | Aslanian et al. ............ 395/575 |
| 5,151,987 | 9/1992 | Abraham et al. ............ 395/575 |
| 5,161,223 | 11/1992 | Abraham .................. 395/600 |

Primary Examiner—Kevin A. Kriess
Attorney, Agent, or Firm—Bell, Seltzer, Park & Gibson

[57] ABSTRACT

In an Object Oriented Programming System, a Communications Interface Packet (CIP) enables processing in either a remote system or in a batch environment. A CIP is an object in an Object Oriented Programming System, and like any other object, the CIP object contains data or attributes surrounded by or encapsulated by methods or actions for those data or attributes. Unique to a CIP, however, are attributes which contain an action, an object and parameters. An Application Programming Interface (API) method enables remote processing. An IPA method, which is the reverse of the API method, creates the CIP object which is to be executed in a remote or batch system through the application programming interface. After a CIP object has been created, it must be flattened or formatted prior to submission to the batch system or prior to sending the CIP object to a remote system. Flattening or formatting puts the CIP object into a flat sequential file known as a product data interface (PDIF) file for use by either the remote or batch system. The PDIF file includes three major sections known as the administrative header section, the data dictionary section, and the object data section.

10 Claims, 12 Drawing Sheets

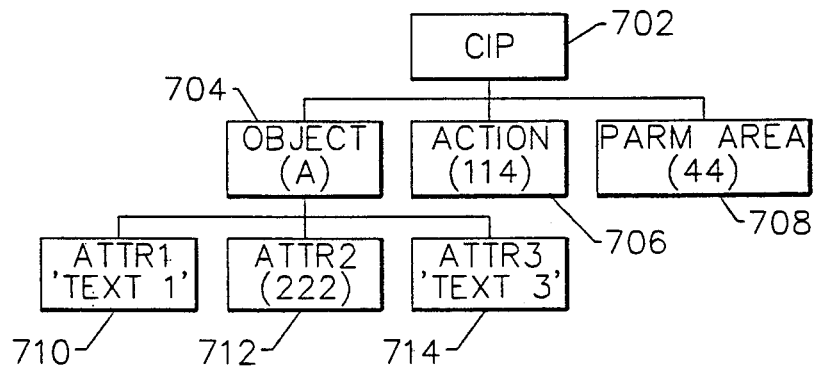

FIG. 7A.

```
PDIF
SECTION,ADMINISTRATIVE_HEADER,BACOMNDR;
OBJ_ACTION,LONG;OBJ_CLASS,LONG;CCSID,SHORT::
114;100;1::
SECTION,DATA_DICTIONARY;
DEFID,1,BAOCIPS;
OBJECT,OBJ_REF;ACTION,LONG;PARM_AREA,SLOT_REF,2:
DEFID,2,BAPICIPP;
VAR_AREA_ADDRESS,STRING;PARAM_OBJ_LIST,LINKLIST:
DEFID,3,A;
ATTR1,STRING;ATTR2,SHORT;ATTR3,STRING::
SECTION,OBJECT_DATA;
1;<ACTUAL OLD OF CIP>;
<ACTUAL OLD OF A>;114;('44';()):
3;<ACTUAL OLD OF A>;
'TEXT1';222;'TEXT3'::
```

FIG. 7B.

REMOTE AND BATCH PROCESSING IN AN OBJECT ORIENTED PROGRAMMING SYSTEM

FIELD OF THE INVENTION

The field of the invention relates generally to an Object Oriented Programming System. More particularly, the invention relates to remote and batch processing in such a system using a communications interface packet (CIP) object.

BACKGROUND OF THE INVENTION

Object Oriented Programming Systems (OOPS) and processes have been the subject of much investigation and interest in state of the art data processing environments. Object oriented programming is a computer programming packaging technique which provides reusable and easily expandable programs. In contrast with other conventional programming techniques which are not easily adaptable to new functional requirements and to new types of data, object oriented programs are reusable and expandable as new requirements arise. With the ever increasing complexity of computer based systems, object oriented programming has received increased attention and investigation. A more detailed description of object oriented programming can be found in a number of references, including *Object Oriented Systems Analysis* by Sally Shlaer and Stephen J. Mellor (Yourdon Press Computing Series, 1988), *Object Oriented Design with Applications* by Grady Booch (The Benjamin/Cummings Publishing Company, 1990), and, *Object Oriented Software Construction* by Bertrand Meyer (Prentice Hall, 1988).

In conventional programming techniques, emphasis is put on the methods to be conducted on particular data sets. However, in Object Oriented Programming Systems, emphasis is instead placed on real world objects which have attributes and actions to be performed on such attributes. An object is a data structure containing information about something of interest to particular systems and its users. For example, in a manufacturing system, an object of interest would be an "Engineering Change" (EC) object which contains information relating to an engineering change made to a part or process in the manufacturing system. This EC object could have information related to the owner of an EC, the number of the EC, or the date that the EC was created. Objects having similar characteristics and common behavior are known as instance objects of a class of objects. Therefore, instance objects contain information about things in the system while class objects contain information about instance objects.

In Object Oriented Programming Systems, messages are sent to objects. A message has three parts. The first part is an object while the second part is an action. The object of a particular message simply identifies that piece of data which comprises a specific object, that is, the instance. The action in the message then specifies what to do with that piece of data or instance. Finally, the third comprises optional parameters for use by the action.

Like conventional programming systems, several types of processing occurs in an Object Oriented Programming System. Examples of such types of processing include interactive, batch, and remote processing. Interactive processing occurs when users are working with an Object Oriented Programming System in real time using computer terminals. During interactive processing, the users submit interactive user commands to the Object Oriented Programming System for further processing. Conventionally, the Object Oriented Programming System processes the interactive user commands by issuing messages to objects. The messages then invoke methods, and the methods perform the functions specified by the interactive user commands.

Batch processing occurs when users submit batch user commands to an Object Oriented Programming System for processing at some later time. Conventionally, in an Object Oriented Programming System a batch user command is represented by one or more objects. These objects may be called queued message requests which are placed in a queue for later scheduling and processing by the Object Oriented Programming System.

Remote processing occurs when users submit remote user commands to the Object Oriented Programming System for processing in remote computing environments. In conventional Object Oriented Programming Systems, these remote user commands are also represented by queued message requests. These queued message requests are sent to the remote computing environment for further processing. This invention is primarily concerned with batch and remote processing in an Object Oriented Programming System, and consequently, operations in these environments will be emphasized throughout the remainder of this disclosure.

In an Object Oriented Programming System, work is accomplished by sending an action request to an object which contains or encapsulates some data. The object will then perform the requested action on the data according to its published specification. The requestor of such action need not know what the actual data looks like or how the object manipulates the data. This technique works quite well in a contained environment or within a given programming system. But in order to execute the action upon the specified object in a remote environment, such as another computing system, some means must be provided to encapsulate and transfer the information to the other system. The system receiving the information must then be able to interpret it, reconstruct the desired action along with its associated parameters, and cause the action to be performed on the appropriate object. A similar problem occurs in the batch processing environment because data is moving from one memory segment to another memory segment. Consequently, the data moving from one segment of memory to another and thus from one memory address space to another must somehow be encapsulated and transferred from the sending memory segment to the receiving memory segment. The receiving memory segment must then be able to interpret the information, reconstruct the desired action with its parameters, and cause the action to be performed on the appropriate object.

SUMMARY OF THE INVENTION

Accordingly, it is an object of this invention to provide an improved Object Oriented Programming System.

It is another object of this invention to enable both remote and batch processing in an Object Oriented Programming System.

These and other objects are provided according to the present invention, by providing a communications interface packet (CIP) which contains all information needed by either a remote system or a batch environment to allow a specified action to be performed on a specified object. A CIP is an object in al Object Oriented Programming System. Like any other object, the CIP object contains data or attributes surrounded by or encapsulated by methods or actions. Unique to a CIP object are attributes which contain actions, objects, and parameters. The action is the identification of the action or method number that is to be executed. The object within the CIP is the identification of the object which the action is to be executed upon, and this identification is an object identification. The parameters contained within the attributes of a CIP object are required to execute the CIP and can be other objects, fixed values, or variable values.

In the remote processing environment, the class of the target object of the CIP object must exist in the remote environment. Two specific methods must be associated with the target object in order to enable either batch or remote processing. The first such method is the Application Programming Interface (API) method. This API method must exist in the remote system in order to do the remote processing. The other required method for a target object is known as the IPA method, which must be also contained in the target object. The IPA method, which is the reverse of the API method, creates the CIP object to be executed in a remote or batch system through the Application Programming Interface.

After a CIP object has been created, it can either be submitted to the batch system or sent to an asynchronous communications server for delivery to a remote system. However, prior to actual submission to the batch system or delivery to a remote system, the CIP object, which is a non-persistent object, must be "flattened" or formatted. This "flattening" or formatting puts the CIP object into a flat sequential file known as a "Product Data Interface Format" (PDIF) file for use by either the remote or the batch system. The PDIF file includes three major sections. The first section is an administrative header, which contains information about the CIP object. The second major section of the PDIF file is the data dictionary, which describes the objects that the associated attributes will map to. The third and final section of the PDIF file contains the object data, including the instances of such objects. It is the PDIF file that has been put into this flat sequential format that is then sent to either the batch system or to the remote system. At the batch or remote system, the flattened PDIF file is then "unflattened" or unformatted for use by such system.

BRIEF DESCRIPTION OF THE DRAWING

FIGS. 7A and 7B illustrate schematic representation of a CIP and its associated PDIF file that the CIP would be formatted into.

DESCRIPTION OF THE PREFERRED EMBODIMENT

The present invention will now be described more fully hereinafter with reference to the accompanying figures, in which a preferred embodiment of the invention is shown. This invention may, however, be embodied in many different forms and should not be construed as limited to the embodiment set forth herein; rather, this embodiment is provided so that this disclosure will be thorough and complete and will fully convey the scope of the invention to those skilled in this art.

Figure 1:
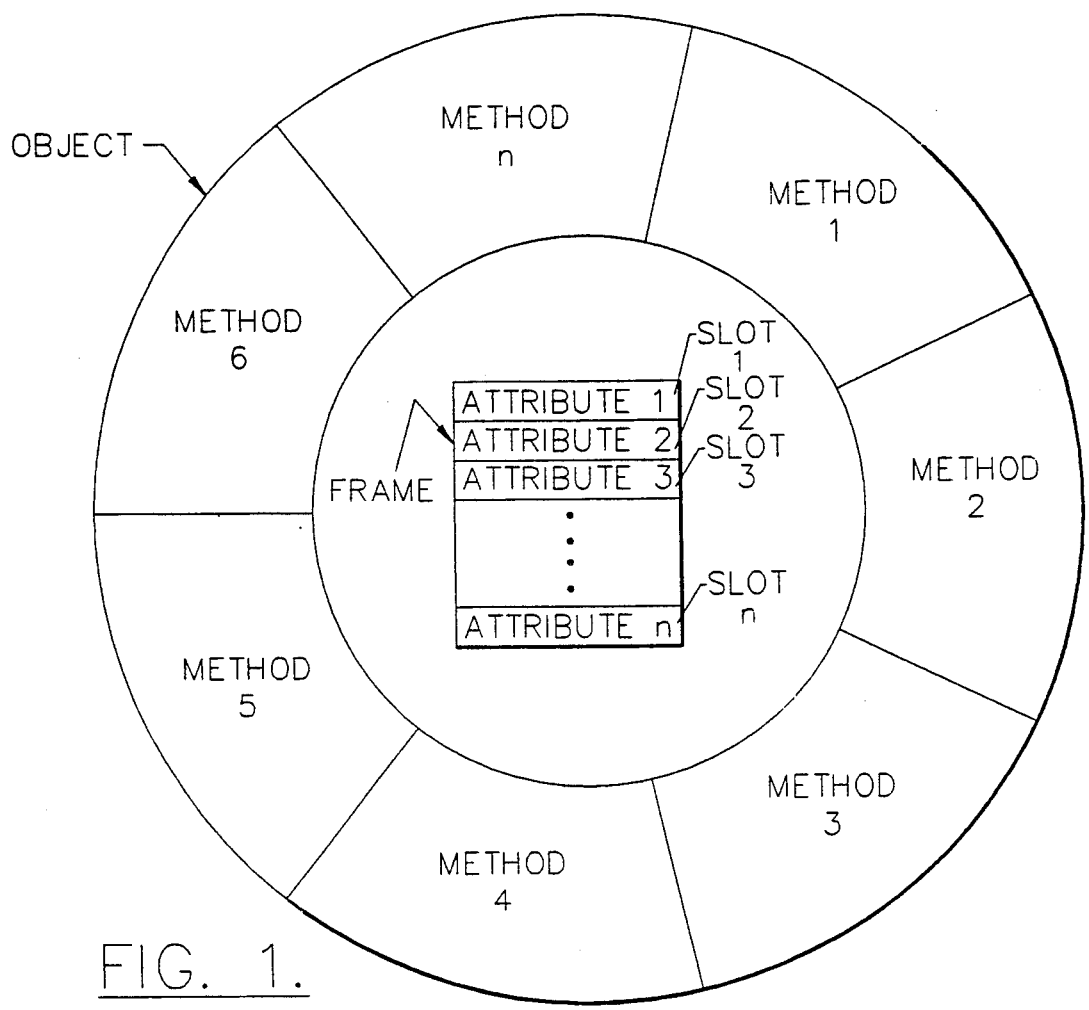
FIG. 1 illustrates a schematic representation of an object.

Referring to FIG. 1, an object is represented in which a frame is encapsulated within its methods. Recall that an object is a data structure and a set of operations that access that data structure. The data structure may be represented as a frame with the frame having many slots, each of which contains an attribute of the data in the slot. The attribute may be a primitive, i.e., an integer or a string, or an object reference which is a pointer to another object's instance or instances. Each action (function) that can access a data structure is called a method.

Figure 2:
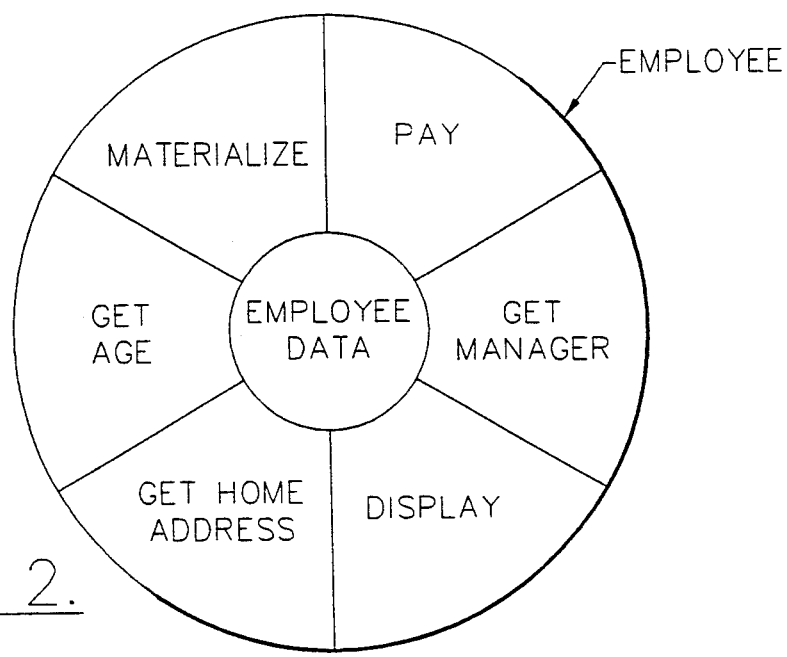
FIG. 2 illustrates a schematic representation of an example of an object.

FIG. 2 illustrates an example of an object, in which the data structure relates to employee data, and a number of methods surround this data structure. One method, for example, contains the age of an employee. Each defined object will usually be manifested in a number of instances. Each instance contains the particular data structure for a particular example of the object. For example, an object for an individual employee named John Smith is an instance of the employee object.

A primary characteristic of OOPS is referred to as encapsulation. As may be seen from FIG. 1, the frame is encapsulated by its methods or functions with a wall of code being placed around each piece of data. All access to the frame is handled by the surrounding methods.

Data independence is thereby provided because an object's data structure is accessed only by its methods. Only the associated methods know the internal data structure of the object.

In an Object Oriented System, a high level routine requests an object to perform one of its methods by sending the object a message telling the object what to do. The receiving object responds to the message by choosing the method that implements the message name, executing this method, and then returning control to the calling high level routine along with the results of the method.

OOPS may be employed as data base management systems which are capable of operating upon a large data base, and which are both expandable and adaptable. In an OOPS data base management system, the data in the database is organized and encapsulated in terms of objects with the instances of the objects being the data in the database. Similarly, the data base manager may be organized as a set of objects with the data base management operations being performed by sending messages from one object to another object. The target or receiving object performs the requested action on its attributes by using its methods.

Figure 3:
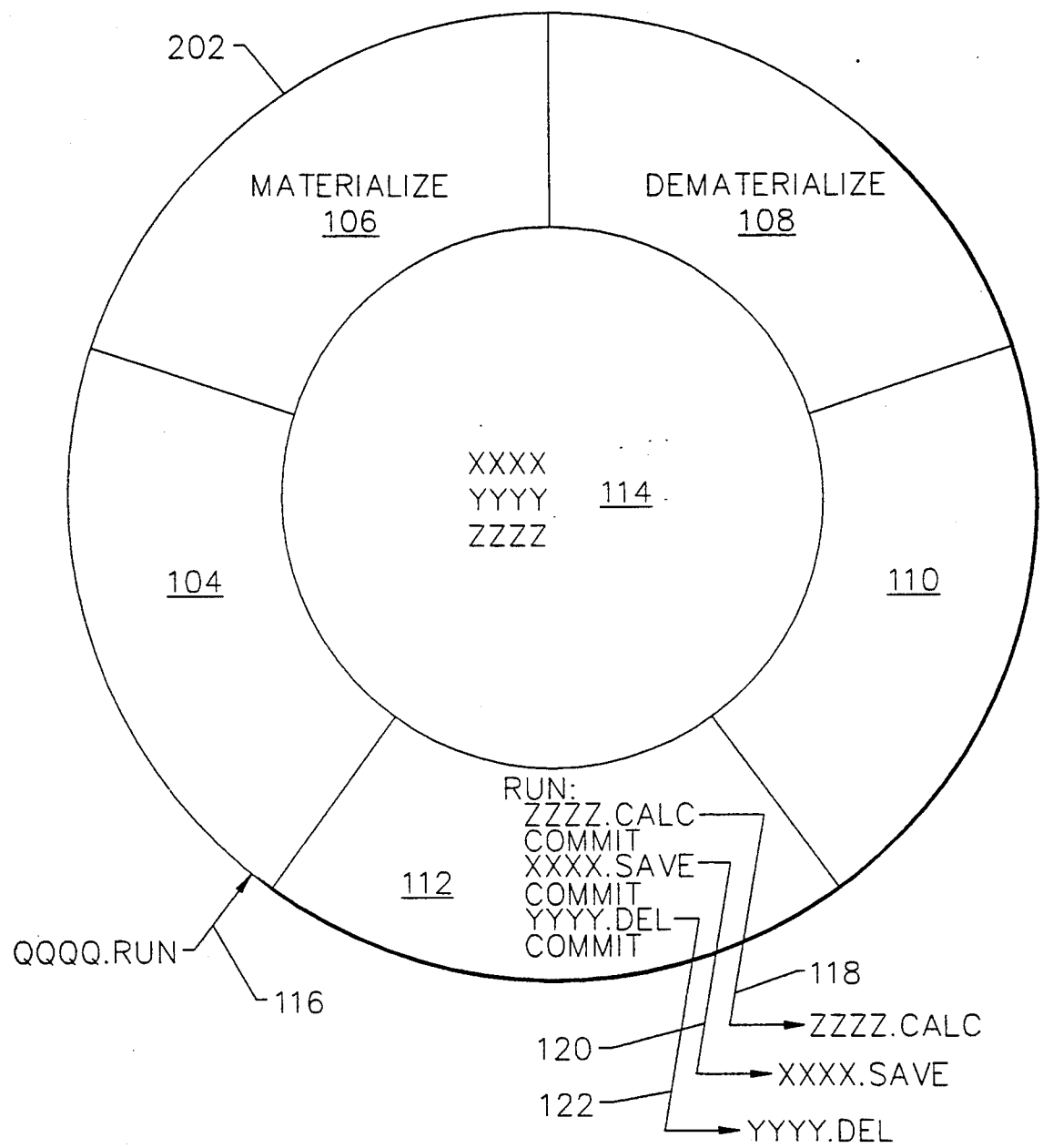
FIG. 3 illustrates a graphical representation of an object instance.

OOPS contain object instances that are referenced by object identifiers and grouped into object classes. FIG. 3 represents a graphical representation of a known object instance 102. The object instance 102 is referenced by an object identifier QQQQ. The object instance 102 contains data 114, known as attributes, and functions 104, 106, 108, 110 and 112, which are known as methods. The object instance 102 could represent an object instance which was created during interactive processing to represent an interactive user command. Alternatively, the object instance 102 could represent a queued message request which was created during batch or remote processing with such requests representing a batch user command or a remote user command.

Figure 4:
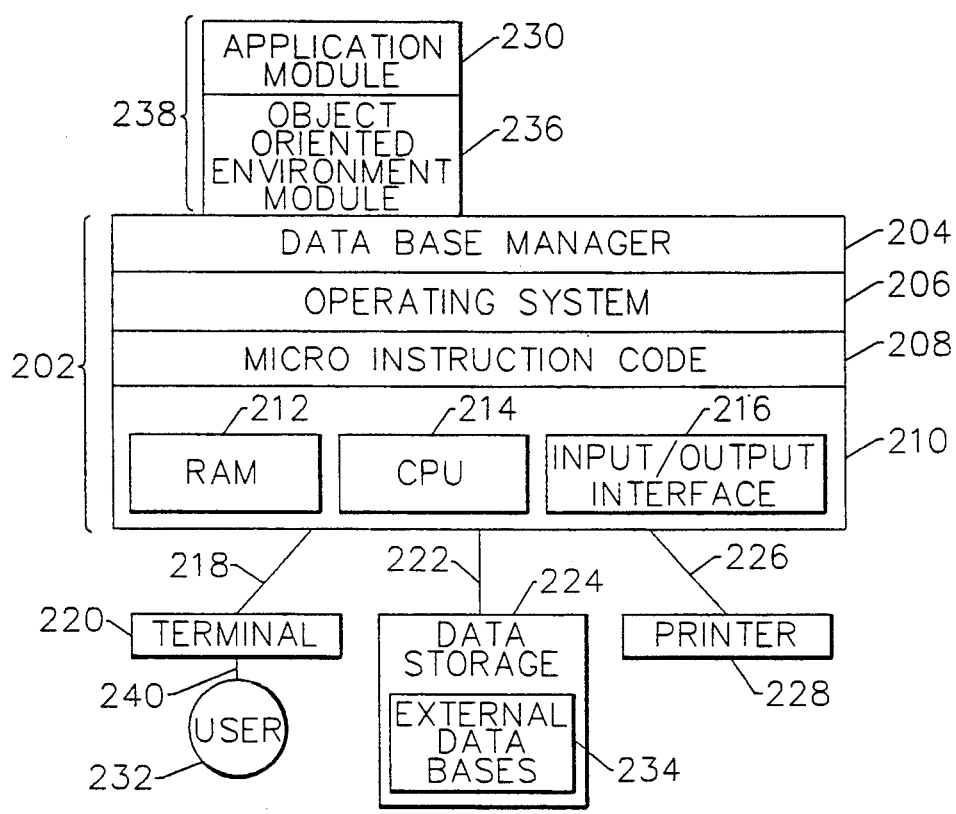
FIG. 4 illustrates a graphical representation of a computing environment in which the present invention operates.

FIG. 4 represents a graphical representation of the computing environment in which the present invention operates. In general, object instances are either persistent, i.e., non-volatile, or non-persistent, i.e., volatile. The object instance 102 shown in FIG. 3 is a persistent object instance. The data 114 associated with such persistent object instance 102 is stored in external data bases 234, as shown in FIG. 4. The external data bases 234 are maintained in a secondary storage 224.

The persistent object instance 102 contains materialize method 106 to read data 114 from external databases 234. Persistent object instance 102 also contains dematerialize method 108 to write data 114 into the external data base 234. Note that there is a difference between writing the data 114 and committing the data 114 to the external data bases 234. Specifically, data 114 which is written to external data bases 234 using dematerialize method 108, is not visible in external data bases 234 until data 114 is committed to external data bases 234 using a commit command. Materialize method 106 is used to load data 114 into a main memory 212 for processing by methods 104, 110, and 112. While processing, methods 104, 110, and 112 cause the dematerialize methods 108 to write the data 114 to the external data bases 234. When the methods 104, 110, and 112 determine that the data 114 is in consistent states, the methods 104, 110, and 112 use the commit command to commit the data 114 to the external databases 234. Data 114 associated with non-persistent object instances is not stored in external databases 234. Additionally, non-persistent object instances do not include materialize methods 106 and dematerialize methods 108.

A message QQQQ.RUN 116 is sent to object 114 from a user 232 via a terminal 220 or from a method associated with another object instance. QQQQ in message 116 identifies the destination object instance 102. RUN in the message 116 identifies the method that is to be executed, thereby invoking method 112 in object instance 102.

Upon invocation, method 112 issues additional messages 118, 120, and 122, with message 118 invoking a method CALC in an object instance ZZZZ. Similarly, message 120 invokes a method SAVE in an object instance XXXX, and message 122 invokes a method DEL in an object instance YYYY.

As shown in FIG. 4, the present invention includes a computer application program 238, which operates on computer platform 202. Platform 202 includes hardware units 210, including a central processing unit (CPU) 214, a random access memory (RAM) 212, and an input/output interface 216. The RAM 212 is also called a main memory 212. Additionally, computer platform 202 includes micro instruction code 208, an operating system 206, and a data base manager 204. Various peripheral components may be connected to the computer platform 202, such as a terminal 220, a data storage device 224, and a printing device 228. The data storage device 224 is also called a secondary storage 224 and may include hard disks and tape drives. Data storage device 224 represents a non-volatile storage which supports commit commands and which includes external databases 234.

In the preferred embodiment of the present invention 238, the computer platform 202 includes a computer having IBM System 370 architecture, and the operating system which runs thereon is an IBM Multiple Virtual Storage (MVS). The database manager 204 is an IBM DB2, which is a relational data base manager. Finally, application program 238 is written in intermediate C, which is an object oriented dialect of the C computer language. Note that intermediate C is similar to the C++ computer programming language. Computer application program 238 includes an application module 230 and an object oriented computing environment module 236. Conceptually, application module 230 would operate on top of the Object Oriented Computing Environment Module 236, which in turn would operate on top of data base manager 204.

Figure 5:
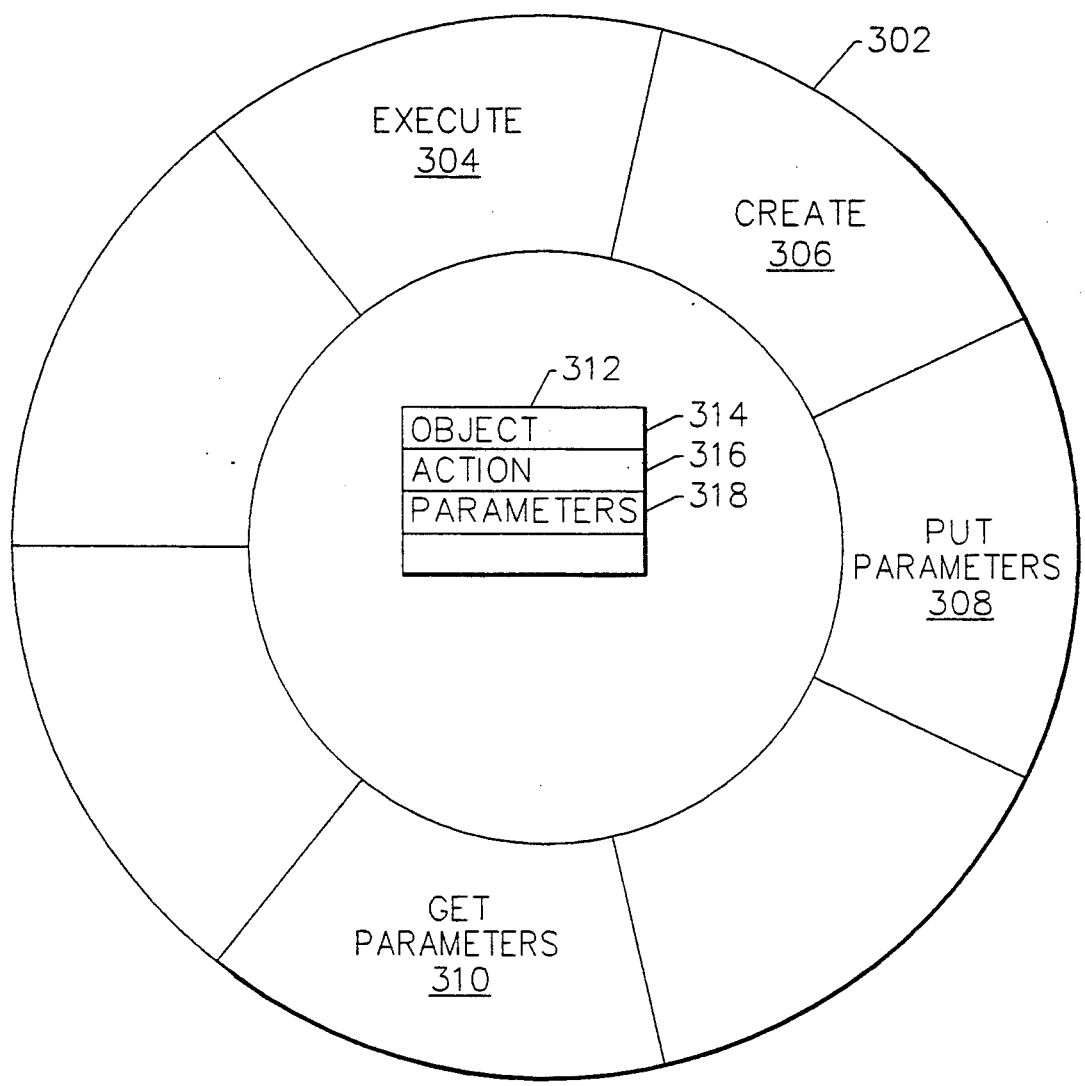
FIG. 5 illustrates a schematic representation of a communications interface packet (CIP) object.

A CIP object 302 is depicted in FIG. 5. Unique to CIP object 302 is the characteristic of having attributes 312 containing object 314, action 316, and parameters 318. Like other objects, CIP object 302 is surrounded by its methods, in this case, EXECUTE 304, CREATE 306, PUT PARAMETERS 308, and GET PARAMETERS 310. A CIP is a form of object/action pair used in either remote or batch processing. Objects that support certain methods for remote or batch processing provide this special CIP interface through two class methods. The first class method is referred to as IPA, which is used to create a CIP, such as CIP 302, for an object instance and action (method). The CIP which is created contains the object instance, method number, and parameters associated with the request as indicated in FIG. 5. The IPA method, which resides in a target object, must set up the parameters in the CIP based on the action of the request. The other class method is known as an API, which is a class method to invoke the particular action required of the CIP object 302. The proper message call to CIP object 302 is made dependent upon the action or method number in CIP 302. For each action supported in the particular class, API will get the proper parameters 318 from CIP 302 and invoke the method or action 316 via a message call.

Figure 6:
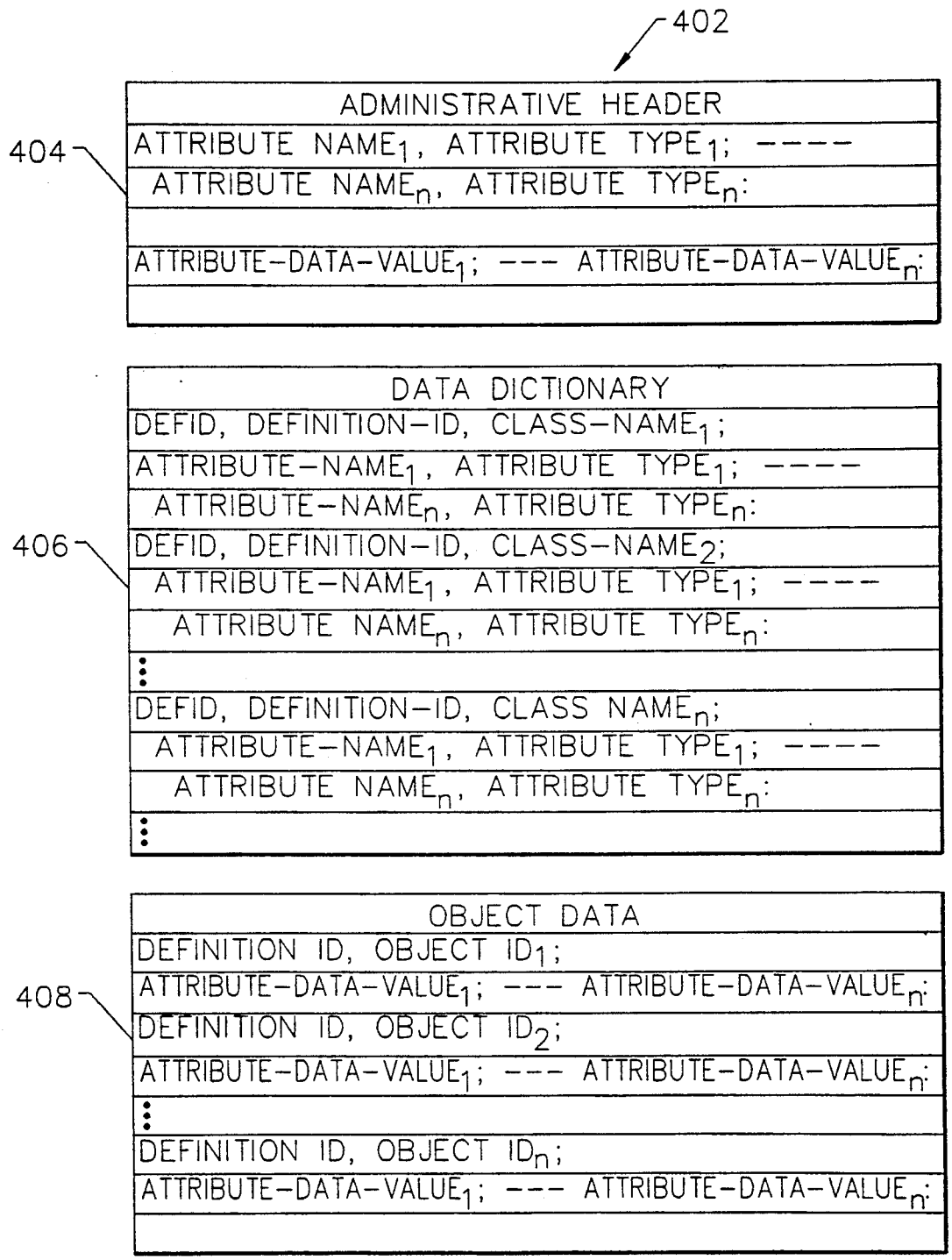
FIG. 6 illustrates a schematic representation of a product data interface (PDI) file.

Before CIP object 302 can be sent for remote or batch processing, it must be put into a flat sequential file known as a PDIF file depicted in FIG. 6. For remote processing, both persistent and non-persistent objects must be flattened or formatted into PDIF file 402. For batch processing, only non-persistent objects need be put into a format such as PDIF file 402. PDIF file 402 comprises three sections. The first section is administrative header 404, which contains both general descriptive information and information needed for communications between different systems. Administrative Header section 404 is made up of a section record, attribute descriptions, which describe the attributes in the header object, and attribute data which contains the actual data of the header object. The only object represented in Administrative Header section 404 is the header class name of the object describing the header data in the PDIF file 402. As seen in FIG. 6, Administrative Header 404 contains the name of each attribute as well as the primitive type of each attribute. The attribute data immediately follows the attribute description and is the actual data of the header class object. Note that each attribute that is defined has a corresponding entry of data separated by a semi-colon and terminated by a colon. An additional colon then terminates all objects.

Data Dictionary section 406 follows Administrative Header section 404 and contains the class names, attribute names, and attribute types of all of the classes that have a corresponding object in Object Data section 408 of PDIF file 402. Every object included in PDIF file 402 has its attribute names and attribute types specified in Data Dictionary section 406 associated with its class name. Note that multiple objects of the same class in PDIF file 402 are described in Data Dictionary section 406 only one time. The object in the Object Data section of Data Dictionary 406 will refer to the proper definition identification (DEFID) of its class in Data Dictionary section 406.

As seen in FIG. 6, Data Dictionary section 406 is made up of a section record and class definitions describing the attributes of all of the objects that are included in PDIF file 402. DEFID is a key word which provides the number of the definition in Data Dictionary section 406. "Definition-id" is a number uniquely identifying a definition within section 406. According to the present invention, the definition-id number begins with the number one (1) and can be incremented by one up to a maximum of 32,000. Also provided in Data Dictionary section 406 is the class name of the object being described, the name of each attribute, and the primitive type of each attribute.

Object Data section 408 follows Data Dictionary section 406 in PDIF file 402 and contains the actual data of each instance attribute in a quasi human readable form. Each object references its class definition identification (DEFID) as defined in Data Dictionary section 406 of PDIF file 402. Note that each object is also identified with a unique object identification, which, when being sent from a system, is its unique data base identification. Object Data section 408 comprises a section record and attribute data for all of the object attribute that are defined in data dictionary section 406 for a particular object class. "Definition-id", "object id", and "attribute data value" describe the attribute data in Object Data section 408. "Definition-id" describes the number of the definition in Data Dictionary section 406 which describes the attributes of a particular object. "Object id" provides the unique identification of the object, while "attribute data value" provides the actual data for the attributes defined in Data Dictionary section 406. Note that the attribute data value is formatted according to the attribute type in the Data Dictionary section 406.

As previously stated, CIP 302 is created to set up a remote request to be executed in a different system than the one in which it was originated, or the CIP 302 is used to defer a request for later, that is, batch processing. Not every object or method supports the CIP interface. Before CIP 302 is executed on another system or in a batch environment, CIP 302 is converted to PDIF file 402 for transmission to the other system or batch environment. FIG. 7A depicts CIP 702, which has Object 704, Action 706 and Parameter Area 708. Additionally, Object 704 includes Attribute 710, Attribute 712 and Attribute 714. FIG. 7B depicts the corresponding PDIF file 722 into which CIP 702 is flattened or formatted. As can be seen in FIG. 7B, PDIF file 722 includes Administrative Header 724, Data Dictionary section 726, and Object Data section 728. Note that Administrative Header 724 of PDIF file 722 includes the attribute name "OBJ ACTION" and the attribute type "LONG". It also includes attribute name "OBJ CLASS", and attribute type "LONG", and attribute name "CCSID", and attribute type "SHORT". The attribute data values for the associated CIP 702 are also included in Administrative Header section 724.

Data Dictionary 726 of PDIF file 722 includes the DEFID, definition-id, class name, attribute name and attribute type, for CIP 702. As seen in Data Dictionary 726, Attribute 710 is named ATTR1 and is a string attribute; Attribute 712 is named ATTR2 and is a short attribute; and, Attribute 714 is named ATTR3 and is a string attribute. Similarly, as shown in Object Data section 728, Attribute 710 of CIP 702 has an attribute data value of "text 1"; Attribute 712 has an attribute data value of "222"; and, Attribute 714 of CIP 702 has an attribute data value of "text 3".

Figure 8A:
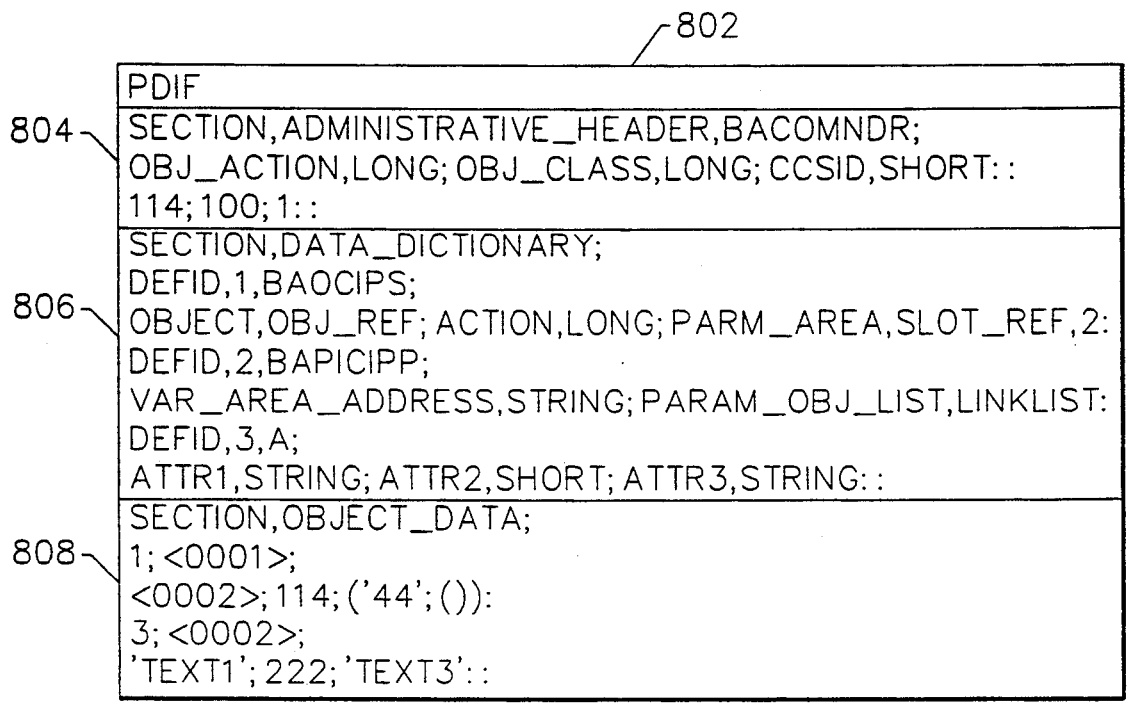
FIGS. 8A and 8B illustrate a schematic representation of a PDIF file and its associated CIP into which the PDIF file would be unformatted into.
Figure 8B:
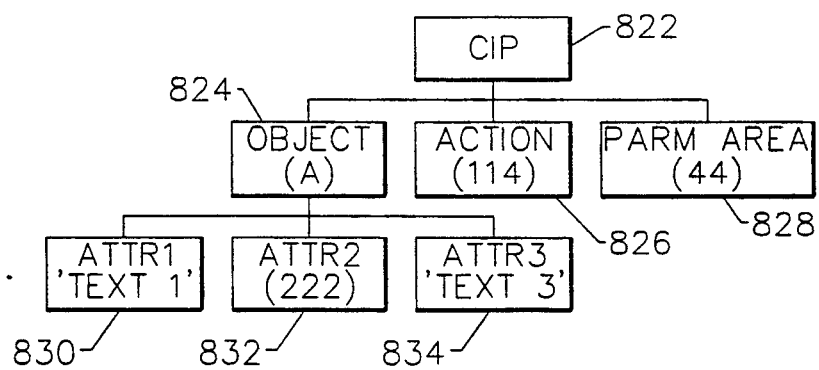

FIG. 8A shows a PDIF file 802 that has either been transmitted to a remote system or has been sent for batch processing. Like other PDIF files, PDIF file 802 includes Administrative Header section 804, Data Dictionary section 806, and Object Data section 808. Before the data in PDIF file 802 can be acted upon by either a remote system or processed in batch mode, it must be unformatted back to its CIP. In this case, that is CIP 822 as shown in FIG. 8B. The file information found in PDIF 802 is then unformatted to CIP 822, which includes Object 824, Action 826, and Parameter Area 828. Note that Object 824 includes 3 attributes; i.e., Attribute 830, Attribute 832, and Attribute 834. The flattening of a CIP into a PDIF file and the export of such flattened file to either a remote system or to a batch file will be discussed hereinafter with respect to FIGS. 14 and 15. Similarly, the unformatting of a PDIF file into a CIP will be explained hereinafter with respect to FIG. 16.

Figure 9:
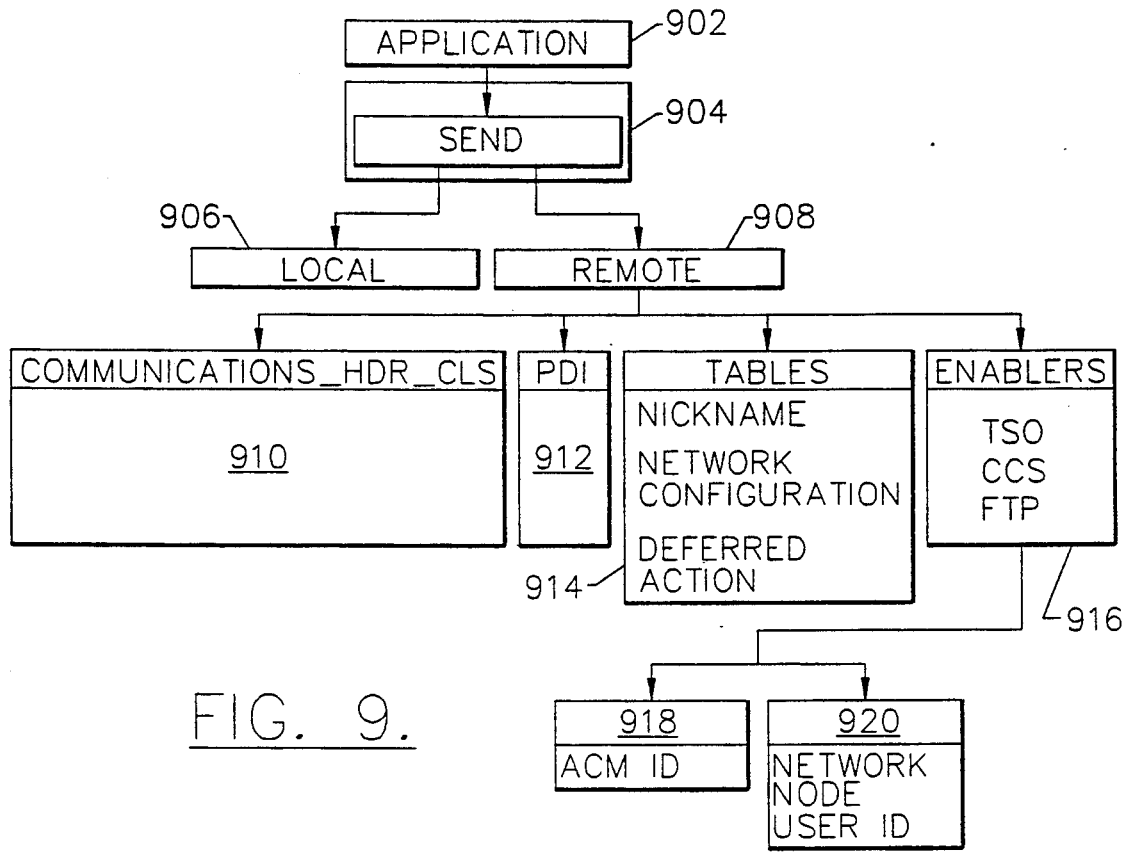
FIG. 9 illustrates a graphical representation of a flow of data from an application through a communication server according to the present invention.

Before data can be sent for either remote or batch processing, Application Module 902 must perform several tasks. The first task is to create a CIP. Application 902 creates a CIP by calling an IPA method on an object that can be flattened or formatted and that is to be sent. As previously discussed, such a CIP will contain an object reference and action and any necessary parameters. In operation, Application 902 invokes an IPA method which creates the CIP and which includes the target object, an action, and the parameters for the target object action. After the CIP has been created, a distribution list is also created. This distribution is a linked list of sending class instances. The parameters for this distribution list require certain information such as the network, node, and userids to which the CIP is to be sent. Finally, an instance of a sendable class is created. This instance requires the following parameters: the CIP, a distribution list, a reason code for the send request, and a notify indicator. After Application 902 has completed these prerequisite tasks, it can then invoke a send method on that newly created sendable class instance to actually send the data. FIG. 9 illustrates the flow of data from Application 902.

Application 902 calls the Send Method 904 of the sendable class instance to process the send request. If the distribution list contains any local distribution list elements, then the CIP is executed locally in block 906. However, if the distribution list contains any remote distribution list elements, then the send request is executed remotely in block 908. The remote execution begins by creating a Communications Header Class 910 which is used to build the Administrative Header of the PDIF file 912. As previously explained, PDIF file 912 includes the CIP and all the object instances that are being sent. The sendable class invokes Network Control Tables 914 which provide information necessary to complete the send request. Network Control Table 914 include a nickname table, which is an unordered list of nicknames that a system user has. Typically, the owner of a particular table assigns nicknames to the userids of local or remote users with whom they wish to communicate. Note that a userid includes the user's logon id, node and network. The Network Configuration Table found in Network Control Tables 914 contains the information about each network or node with which the system can communicate. Network Configuration Table identifies the system, the asynchronous communication manager id of the system, the network node and userid, the maximum allowable job size, the local administrator, the supported enablers, and the default enabler that would be used. The Deferred Action Table found in Network Control Table 914 identifies the objects and actions that can be transmitted in batch or interactive mode. Deferred Action Table indicates whether a send request should be run in batch or interactive mode and supplies a JCL template to use for batch processing if the batch mode is selected. The Sendable Class 904 also invokes the appropriate Enabler 916 to perform the transmission of data required. The chosen one of the Enablers 916 sends the data to the appropriate destination, in this case, to Asynchronous Communication Manager (ACM) id 918, or Network Node Userid 920. Note that asynchronous communication is communication in which the data is received automatically and require no direct user involvement. This is in contrast to synchronous communication in which the data is received in direct response to a user request.

Figure 10:
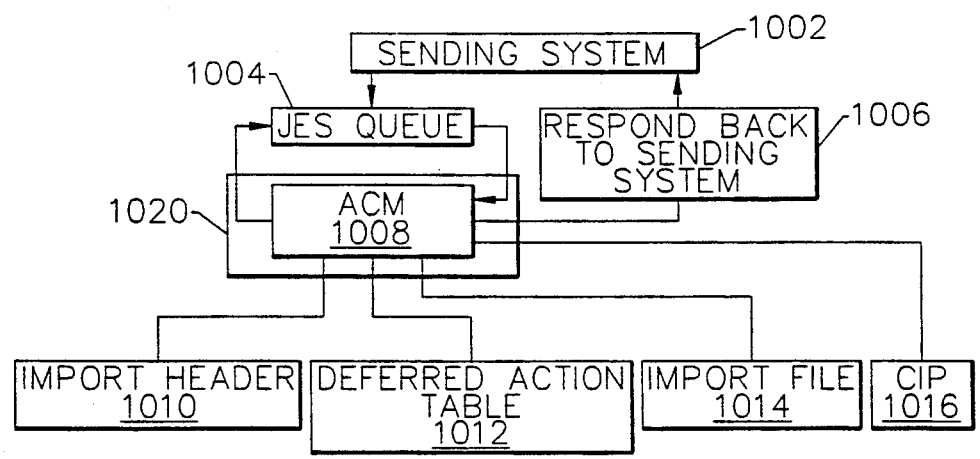
FIG. 10 illustrates a graphical representation of the flow of data from a sending system through a communications server using an asynchronous communications manager (ACM) according to the present invention.

FIG. 10 illustrates the flow of data from Sending System 1002 through Communication Server 1020. Communication Server 1020 receives data asynchronously through ACM 1008. ACM 1008 runs continuously regularly timed checks of JES Queue 1004 for transmitted data. In order to receive a file from JES Queue 1004, ACM 1008 must receive the file in its proper PDIF format with a communication header and a CIP.

In operation, sending system 1002 sends data to the receiving system JES Queue 1004. As previously stated, ACM 1008 runs continuously, checking JES Queue 1004 for transmitted data. When ACM 1008 finds data in JES Queue 1004, it receives the file. According to the present invention, the file is received into the MVS system. ACM 1008 calls the PDIF file class import header method which imports the administrative header of the corresponding PDIF file into the Communication Header Object 1010. This object provides information necessary to perform security checking. ACM 1008 then sends a response back 1006 to Sending System 1002. ACM 1008 then determines from Deferred Action Table 1012 how to execute the received CIP, that is, in either the batch or interactive mode. ACM 1008 then calls the PDIF file class import file 1014 method which imports the PDIF file into the system objects, and then executes the CIP 1016. ACM 1008 finally sends a response to sending system 1002 to indicate successful or unsuccessful execution of CIP 1016.

Figure 11:
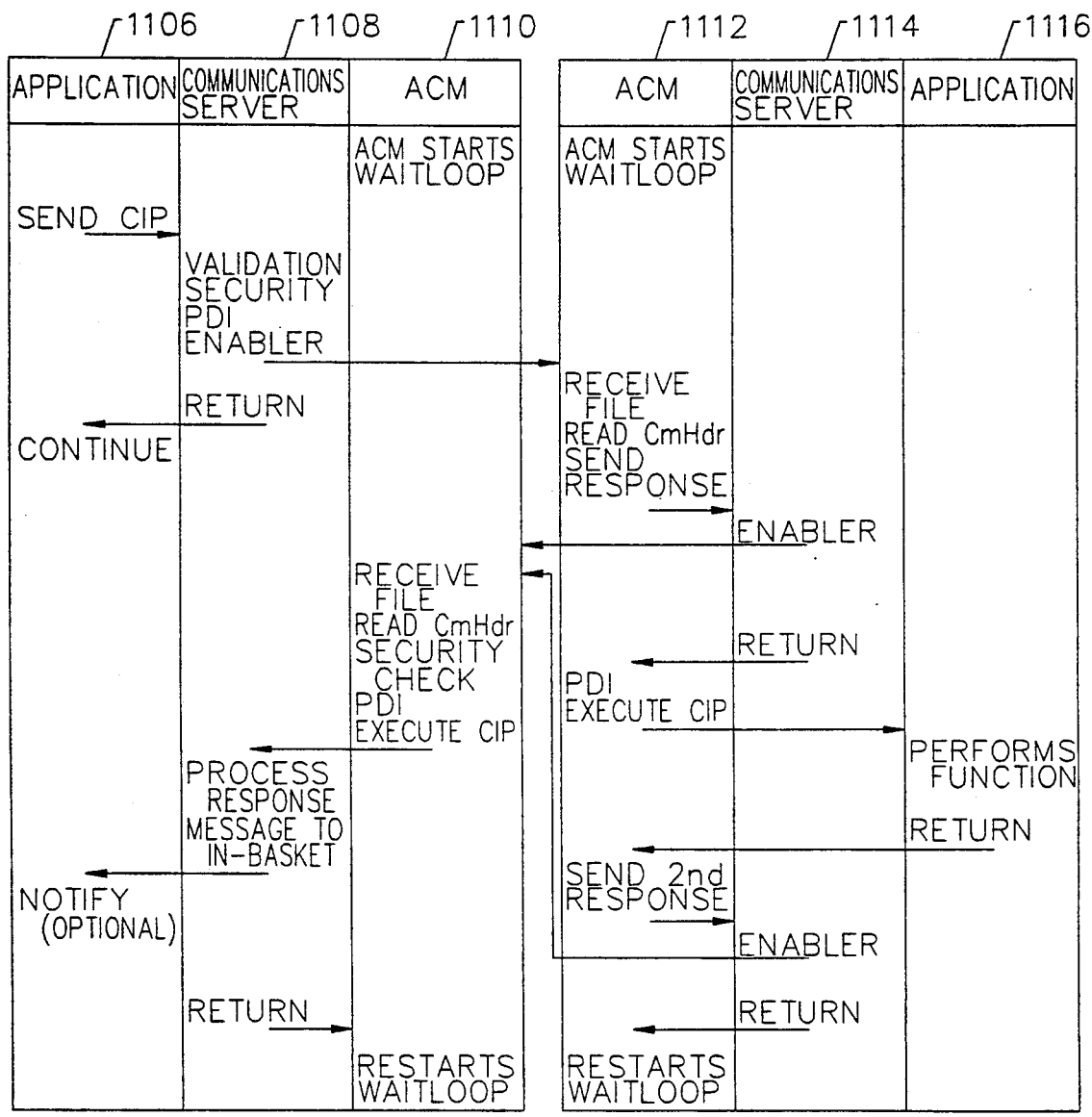
FIG. 11 illustrates a graphical representation of the transfer of data between two systems, one a sending system and the other a receiving system, according to the present invention.

FIG. 11 demonstrates how data is transferred between two systems, 1102 and 1104. Note that System 1102 includes Application 1106, Communication Server 1108 and ACM 1110, while system 1104 includes Application 1116, Communication Server 1114, and ACM 1112. FIG. 11 demonstrates how a communication server's send and receive facilities work together during a file transfer. For example, Application 1106 requests that a CIP be sent to System 1104. Communication Server 1108 performs the necessary validation and security checks, then calls the Product Data Interface to transform an object into a PDIF file for exporting to System 1104. After the PDIF file is created, Communication Server 1108 calls the appropriate enabler to send the file to System 1104's ACM 1112. After the file is sent, Communication Server 1108 returns control to Application 1106.

ACM 1112 receives the file from its JES queue, reads the communications header of the PDIF file and calls Communications Server 1114 to send a response acknowledging receipt of the file. Communications Server 1114 sends the response back to ACM 1110. ACM 1110 receives and processes this response. Next, Communications Server 1114 returns control to ACM 1112 and ACM calls the PDIF System 1104 to transform the PDIF file. ACM 1112 then executes the CIP. Application 1116 performs the action of the received CIP and returns control of processing to ACM 1112. ACM 1112 calls its own communication server to send a second response indicating that there has been a successful execution of the CIP. Communication Server 1114 calls the appropriate enabler in the response. ACM 1110 receives the response from its JES queue and reads the communications header of the sent PDIF file. ACM 1110 then calls PDI to transform the PDIF file into objects. Communication Server 1108 then processes the response and places a notification message in the user's in basket if a notification has been requested. Communication Server 1108 then returns control of processing to ACM 1110 which restarts it wait cycle.

Figure 12:
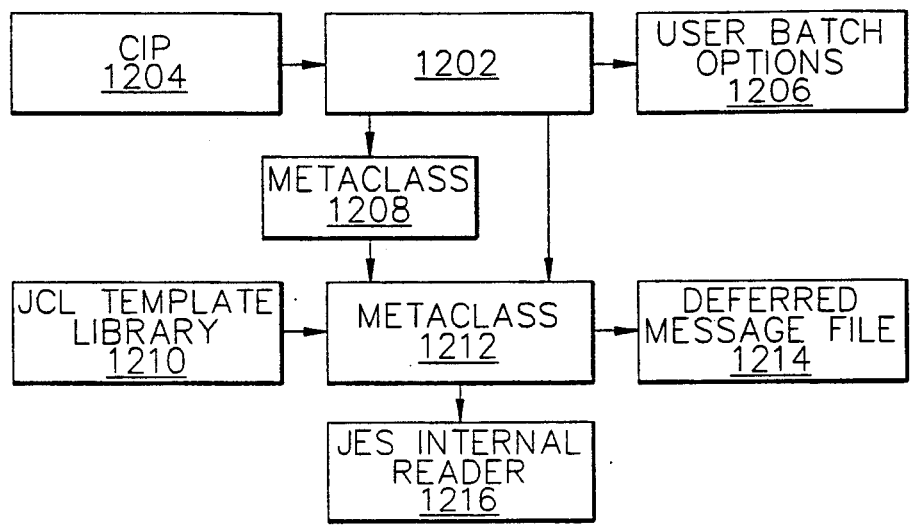
FIG. 12 illustrates a graphical representation of the creation of a batch job and an its associated submission process according to the present invention.
Figure 13:
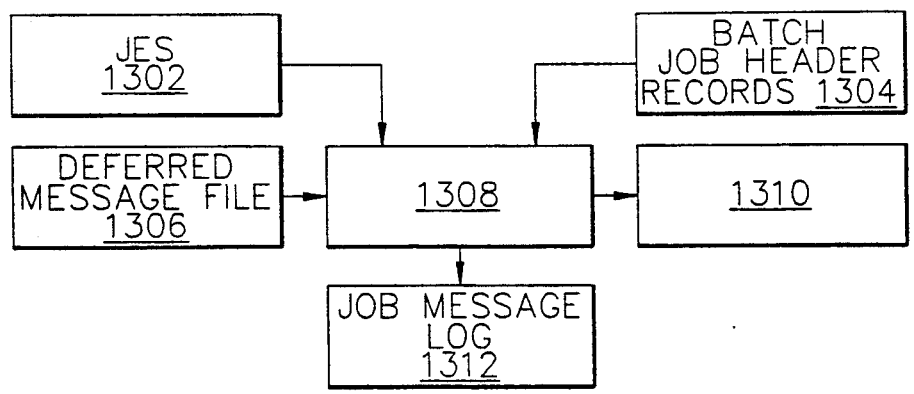
FIG. 13 illustrates a graphical representation of the execution process for a batch job, according to the present invention.

Batch processing will now be discussed in more detail with respect to FIGS. 12 and 13. Application 1202 requests batch services by creating CIP 1204 and storing all persistent objects in its database. The start method in Meta-class 1208 is invoked to begin the batch processing. An instance is created to permit the user to specify the batch information required for the batch job. The batch instance receives a copy of the user batch options 1206 and the user then decides whether to use the default batch options or to modify those defaults. After this class is completed, the resulting instance is used as the batch object information for the job. The start method for Meta-class 1208 invokes the submit job method of Meta-class 1212, thereby passing the batch options information in the instance as a parameter. The appropriate JCL template library 1210 is also passed based on values stored in a deferred action table. The submit job method then starts the process of creating the batch job file. Alternatively, an application can bypass the user batch options 1206. The submit job method copies a JCL template, each record in the JCL template is then scanned and parameter substitution is performed using the batch options information wherever substitution parameters are encountered. One record in the JCL template contains a reference to Deferred Message file 1214. When this record is encountered, the submit job method invokes PDI to create the file. Creating this deferred message file involves formatting CIP 1204 and storing the formatted CIP and associated non-persistent objects in a disk sequential file for exportation to batch processing. Finally, the submit job method writes each record of the batch job file to JES Internal Reader 1216. When this process is complete, the JES 1302 schedules the necessary resources to execute the job in the batch environment.

Job entry subsystem (JES) 1302 is an operating system service used to start a background job. After JES 1302 has acquired all that necessary resources to run a batch job, control is passed to a Time Sharing Option (TSO) Command Processor 1308. TSO command processor 1308 then invokes the start method to begin batch processing. Batch Job Header Records 1304 are stored in a batch job file as an in stream data set. These header records are used to get the job owner userid, the specified in-basket userid, the job name, and the notify flag for the job. The deferred message file 1306 is imported to unformat CIP 1204. CIP 1204 and all associated non-persistent objects are then unformatted and recreated in batch memory. At that time, CIP 1204 is executed by Meta-class 1310. Job Message Log 1312 contains a job started message, a job completed message, and any batch generated error messages.

As previously explained, the Product Data Interface (PDI) represents the interface of data to and from an OOPS according to the present invention. PDI enables existing applications as well as future applications in an OOPS environment to exchange data with other OOPS. Such data exchange is accomplished using PDIF files which are created through the PDI. PDIF files are both exported to other systems and imported from other systems through the product data interface, and data read from a PDIF file is used to create objects.

Figure 14:
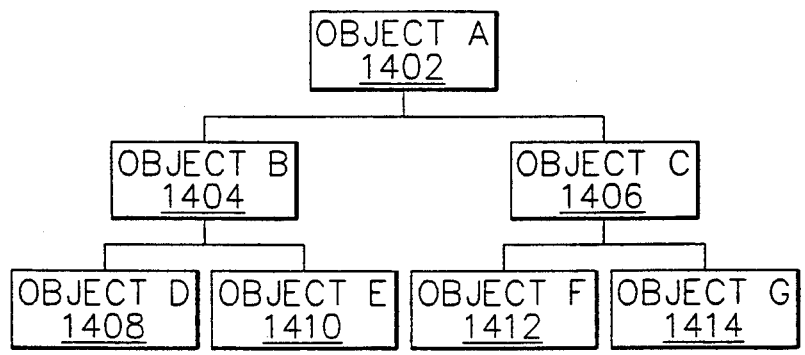
FIG. 14 illustrates a graphical representation of a view list, which is a list of references to object instances.

For an OOPS object, according to the present invention, to be exported to another system, it must be flattenable, i.e., capable of being formatted into a flat sequential file. In order to accomplish this, the object must be able to inherit a flattenable class or some descendent of a flattenable (formattable) class which supplies the methods that enable PDI to format or flatten the object as well as the methods that establish the object and the other object instances that it refers to in the view list. A view list is a list of references to object instances which conceptually resembles a tree structure. This list of instances defines the exported objects. An example of such a view list is shown in FIG. 14. During an export procedure, an object that is being exported has its view method called by a translation class. This object shown as Object A 1402 in FIG. 14 is referred to as the top object. The view method includes its own object, i.e., Object A 1402, in the view list based on the reason that Object A 1402 is being exported. The view method of Object A 1402 then calls the view method of each of the instances that the top object references based on the reason for the export. In this example, Object A 1402 references Object B 1404 and Object C 1406. Likewise, the view method of Object B 1404 and Object C 1406 include their own objects in the view list and then call the view methods on the instances that Object B 1404 and Object C 1406 reference. In this case, Object B 1404 references both Object D 1408 and Object E 1410. Similarly, Object C 1406 reference Object F 1412 and Object G 1414. This process continues for all referenced objects, thereby establishing the view list of objects for conversion to a PDIF file.

When PDI converts a view list to a sequential file in PDIF, the object instances and their attributes appear in the Data Dictionary and Object Data Section of the associated PDIF file in a hierarchical order. The data dictionary object data section of such PDIF file created from the example shown in FIG. 14 would contain the object instances and their attributes in the following order: Object A 1402; Object B 1404; Object D 1408; Object E 1410; Object C 1406; Object F 1412; and, Object G 1414.

In addition to a view list, such as shown in FIG. 14, each formattable object also provides a characteristic known as meta-data to PDI, in order to enable PDI to format such object into a PDIF file. Meta-data is the self-defining data that describes an object class and its instance attributes. Such meta-data includes information such as an object class name, and for each instance attribute of the object, it also includes the following: an attribute name; an attribute type; a PDI usage specification (for example, INCLUDED, EXCLUDED, IGNORE, or REQUIRED); an offset within the frame of the object; the maximum length of the attribute if the attribute is a string type; and, finally, the slot class ID if the attribute is a slot reference type attribute.

The PDI usage specifications found in an object's meta-data and described above will now be defined. INCLUDE means to export that particular attribute. EXCLUDE means do not export that attribute. IGNORE means do not import the attribute from another system. Finally, REQUIRED means to generate an error if the attribute is not present when importing from another system. PDI uses the meta-data structure described here and above when exporting data from one system or importing data from another system. The availability of such meta-data enables PDI to automatically format and unformat object oriented instances in an OOPS. Without such meta-data, each object would instead have to do its own formatting and unformatting, which would be a very inefficient process.

Figure 15:
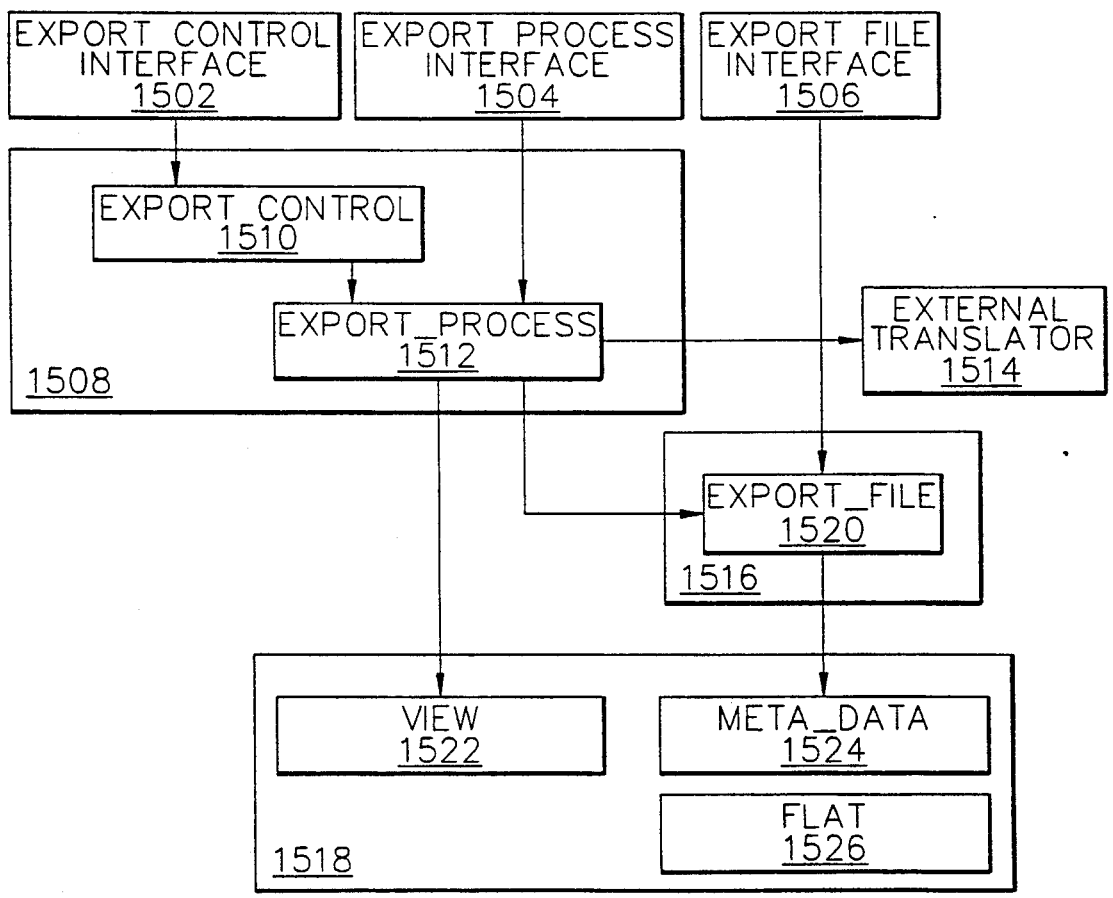
FIG. 15 illustrates a graphical representation of the flow of data through a PDIF in response to a request to export such data.

FIG. 15 illustrates the flow of data through PDI in response to an export request. The Export Control Method 1510 of Class 1508 calls the Export Process Method 1512 to handle PDI processing. Export Control Method 1510 receives information from Export Control Interface 1502 and Export Process Method 1512 receives information from Export Process Interface 1504. Export Process Method 1512 then calls the View Method 1522 of the Top Formattable Object 1518. This then establishes the view list of the object instances which are to be exported to another system. Export Process Method 1512 then calls the Export File Method 1520 of PDI file class 1516 in order to build the PDIF file. PDI file class 1516 uses the view list established by view method 1522 to create the PDIF file. PDIF File Class 1516 builds the Administrative Header Section of the PDIF file from the Communication Header Class Instance using its meta-data and formatting methods. PDI File Class 1516 then builds the Data Dictionary Section of the PDIF file using the Meta-Data Method 1524 from all objects in the view list created by View Method 1522. PDI File Class 1516 then builds the object data section using the meta-class and formatting methods. After PDI File Class 1516 has built the PDIF file for export to another system, Translation List Class 1508 and, specifically the Export Process Method 1512, calls External Translator 1514 to translate the file into a different format, if required.

An application uses export control interface 1502 when it calls the Export Control Method 1510 of Translation List Class 1508. This method then handles PDI processing requests from other panels. To use Export Control Interface 1502, an application first creates an instance of Translation List Class 1508. The application then creates and inserts instances into the Object of Translation List Class 1508 and assigns attributes of the created objects with appropriate translation request information. The application then creates an instance of PDI File Class 1516 to be used as the exported file and assigns the instance of PDI file class 1516 as an attribute of the previously created object.

An application uses Export Process Interface 1504 when it calls Export Process Method 1512 of Translation List Class 1508. Export Process Method 1512 then handles internal PDI processing. In order for an application to use Export Process Interface 1504, it must first create an instance of Translation List Class 1508. Note that an object of Translation List Class 1508 is a linked list of instances. The application subsequently creates and inserts such instances into the object of Translation List Class 1508, and assigns attributes of such objects with appropriate translation request information. Next, the application creates an instance of PDI File Class 1516 to be used as the file to be exported to another system, and assigns PDI File Class 1516 instances as attributes of the created object. Finally, the application calls the Export Process Method 1512 of the instance of Translation List Class 1508. An application uses Export File Interface 1506 when it calls the Export File Method 1520 of PDI File Class 1516. Export File Method 1520 then builds a PDIF file from a view list and Export Process Method 1512 of Translation List Class 1508 uses this lower level interface.

Figure 16:
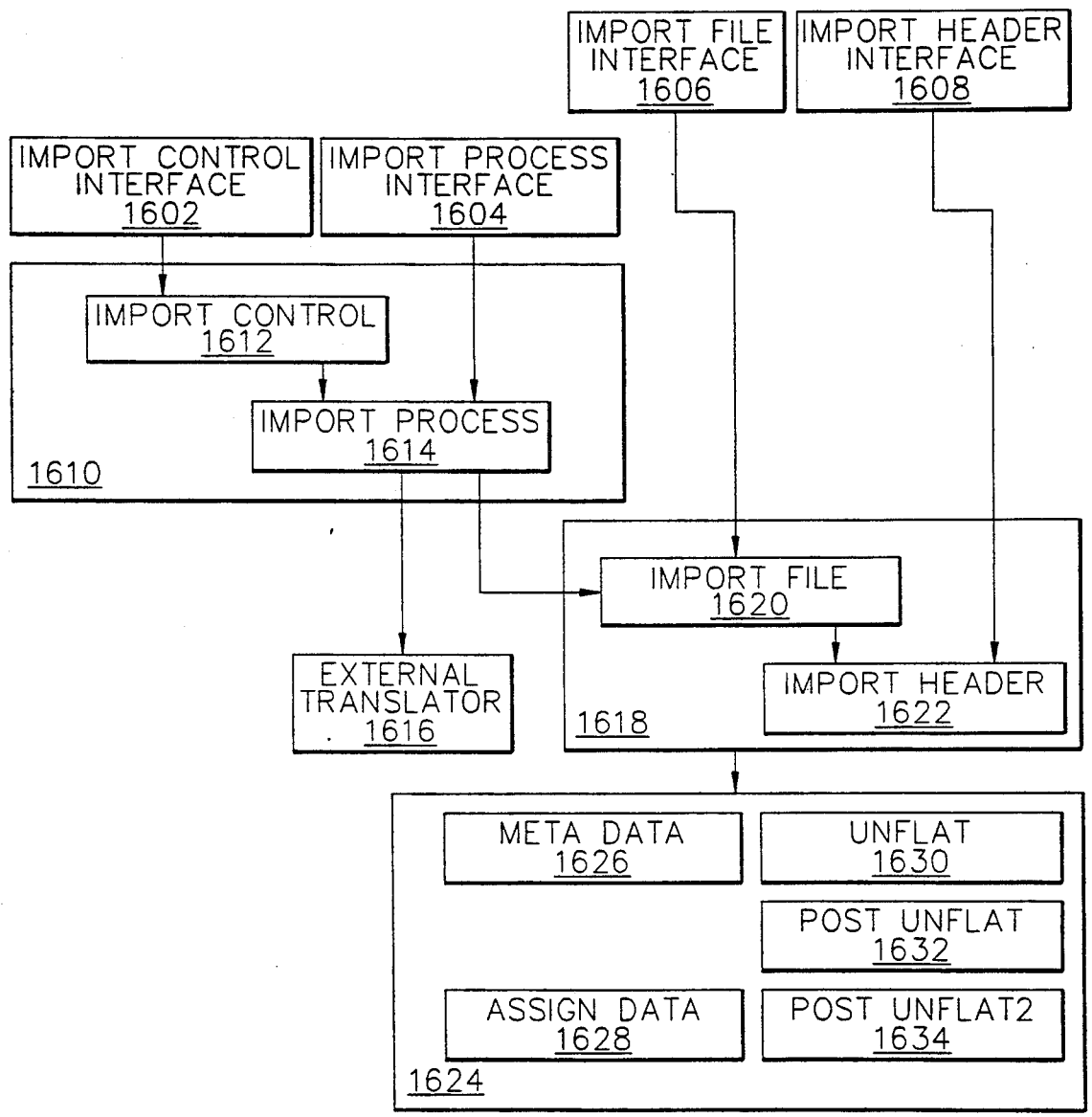
FIG. 16 illustrates the flow of data through a PDIF in response to a request to import such data.

FIG. 16 illustrates the flow of data through PDI in response to an import request. Import Control Method 1612 of Translation List Class 1610 calls the import process method 1614 to begin the PDI processing. Translation List Class 1610 can call an External Translator 1616 if required to translate the file from its current format into a PDIF file, which can then be operated upon. Import Process Method 1614 of Translation List Class 1610 then calls the Import File Method 1620 of PDI File Class 1618, which builds objects from the received PDIF file. Import File 1620 is called by the system's asynchronous communications manager across Import File Interface 1606. The Import File Method 1620 of PDI File Class 1618 calls the Import Header Method 1622 which builds a communications header class object from the administrative header of the PDIF file using the Meta-data Method 1626 and the Unflat Method 1630 of Formattable Object 1624. Import Header Method 1622 is called directly through Import Header Interface 1608 by the system's asynchronous communications server. The Import File Method 1620 of PDI File Class 1618 builds objects from the data dictionary and object data sections of the PDIF file. In order to accomplish this, the Meta-data Method 1626, Unflat Method 1630, and Post-unflat Method 1632 of Formattable Object 1624 are called by PDIF File Class 1618. Import File Method 1620 of PDIF File Class 1618 also support initial data base loads by calling the Assign Data Method 1628 and the Post Unflat Two Method 1634 of Formattable Object 1624.

In the drawings and specification, there have been disclosed various preferred embodiments of the invention and, although specific terms are employed, they have been presented by way of example and not limitation. Thus the breath and scope of the present invention should not be limited by any of the above described embodiments, which should be defined only in accordance with the following claims:

What is claimed is:

1. A remote and batch object processing process for an object oriented computing system, said object oriented computing system including a plurality of objects, each object comprising an object frame and at least one object method, said object frame containing at least one data attribute of said object, said at least one object method comprising at least one method performed by said object oriented computing system upon at least one data attribute of the object associated with said at least one object method, said remote and batch object processing process comprising the following steps which are performed by said object oriented computing system:

determining that a selected object method of a selected object is to be processed by one of a batch system and a remote system;

creating a Communications Interface Packet (CIP) object from said selected object, said CIP object including a CIP object frame and at least one CIP object method, said CIP object frame including a pointer to said selected object and a pointer to said selected object method; and delivering said CIP object to said one of a batch system and a remote system, for batch or remote processing respectively, of said selected object.

2. The process of claim 1 wherein said delivering step comprises the steps of:

placing said CIP object into a sequential file; and delivering said sequential file containing said CIP object to said one of a batch system and a remote system.

3. The process of claim 2 wherein said placing step comprises the steps of:

generating an administrative header identifying said CIP object;

generating a data dictionary including a description of said selected object; and generating object data including instances of said object; and wherein said delivering step comprises the step of delivering said administrative header, said data dictionary and said object data to said one of a batch system and a remote system.

4. The process of claim 3 wherein said administrative header comprises a name and a type of an attribute, and a data value of said attribute.

5. The process of claim 3 wherein said data dictionary comprises a description of an object in said object data, said description including a class name, attribute name and attribute type of said object.

6. The process of claim 3 wherein said object data comprises a unique identification for each object in said sequential file.

7. The process of claim 1 wherein said CIP object frame further comprises at least one parameter further defining an action to be performed by said selected method on said selected object.

8. An object oriented computing system comprising:
means for determining that a selected object method of a selected object is to be processed by one of a batch system and a remote system;
means, responsive to said determining means, for creating a Communications Interface Packet (CIP) object from said selected object, said CIP object including a CIP object frame and at least one CIP object method, said CIP object frame including a pointer to said selected object and a pointer to said selected object method; and
means, responsive to said creating means, for delivering said CIP object to said one of a batch system and a remote system, for batch or remote processing respectively, of said selected object.

9. The object oriented computing system of claim 8 wherein said delivering means comprises means for placing said CIP object into a sequential file and means for delivering said sequential file containing said CIP object to said one of a batch system and a remote system.

10. The object oriented computing system of claim 9:
wherein said placing means comprises means for generating an administrative header identifying said CIP object, means for generating a data dictionary including a description of said selected object, and means for generating object data including instances of said object; and
wherein said delivering means comprises means for delivering said administrative header, said data dictionary and said object data to said one of a batch system and a remote system.

* * * * *